(12) United States Patent
Jones et al.

(10) Patent No.: US 7,743,039 B2
(45) Date of Patent: Jun. 22, 2010

(54) FILE OPERATIONS WITH MULTIPLE LEVEL FILE LOCKING TECHNIQUES

(75) Inventors: Chad Frederick Jones, Cypress, TX (US); John M. Eastman, Jr., Katy, TX (US); John Thomas White, Jr., Houston, TX (US); Charles G. Mattair, Jr., Houston, TX (US)

(73) Assignee: SimDesk Technologies, Inc., Houston, TX (US)

( * ) Notice: Subject to any disclaimer, the term of this patent is extended or adjusted under 35 U.S.C. 154(b) by 262 days.

(21) Appl. No.: 11/609,206

(22) Filed: Dec. 11, 2006

(65) Prior Publication Data

US 2008/0140663 A1 Jun. 12, 2008

(51) Int. Cl.
*G06F 17/30* (2006.01)
(52) U.S. Cl. .............................. 707/704; 707/999.008; 707/999.1; 707/999.2; 709/210
(58) Field of Classification Search .......... 707/999.001, 707/999.008, 999.1, 999.2; 709/201, 210
See application file for complete search history.

(56) References Cited

U.S. PATENT DOCUMENTS 6,178,440 B1 * 1/2001 Foster et al. ................. 709/201
2003/0105755 A1 * 6/2003 Daynes .......................... 707/8

FOREIGN PATENT DOCUMENTS

WO WO 89/03086 * 1/1988

* cited by examiner

*Primary Examiner*—Fred I Ehichioya
(74) *Attorney, Agent, or Firm*—Wong, Cabello, Lutsch, Rutherford & Brucculeri LLP

(57) ABSTRACT

File systems which provide several different and improved locking capabilities. An application on a client workstation communicates through a client driver to a server which interfaces with a metadata database, which contains locking information about the files. Applications perform as normal. The client driver provides lock and unlock requests to the server when a write lock or a read with intent to write lock is required. If only a read lock is considered appropriate, the client driver does not provide a lock request. The server transparently performs read operations and read locking using the metadata database without specific requests from the client driver. When a read with intent to write or write lock is required, the lock ownership is placed with a given expiration time. When the time expires the lock is not automatically released but remains with the particular requesting client driver until another client driver requests it.

4 Claims, 7 Drawing Sheets

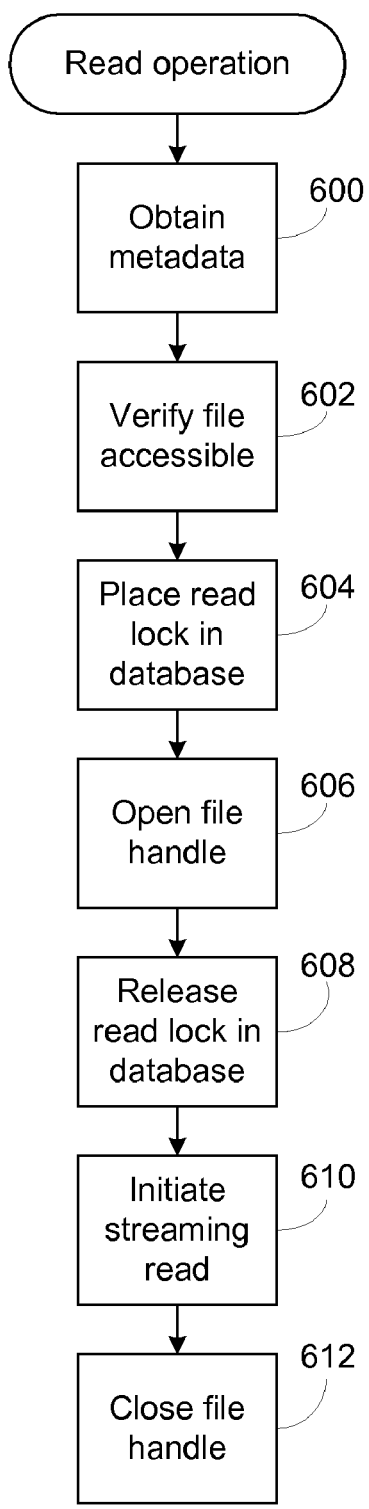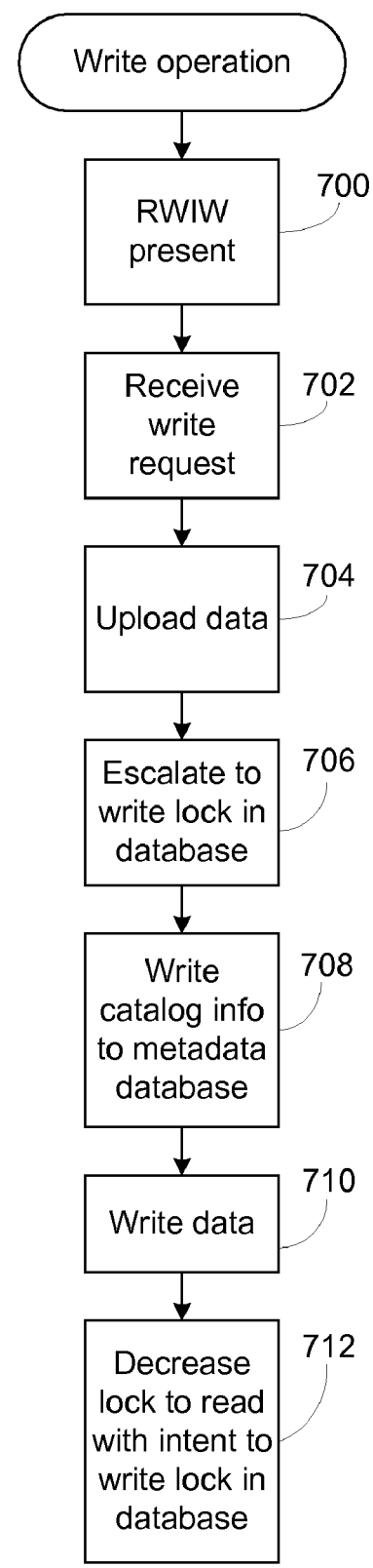
Fig. 6
Fig. 7

FILE OPERATIONS WITH MULTIPLE LEVEL FILE LOCKING TECHNIQUES

BACKGROUND OF THE INVENTION

1. Field of the Invention

The invention generally relates to file operations and more particularly to locked file operations.

2. Description of the Related Art

Collaboration is increasing in the modern computing age. To this end many different users may try to access a given file from a common file server. This creates problems when the file is downloaded by two local clients for operation and one of the clients' requests or performs a write operation, with either the write operation being prohibited or the other client operating using a stale file version.

In this multi-user collaborative environment techniques have been developed to provide control or ownership of the data. For example, in most prior art database systems, a database client creates a transaction with an operation to the database. The client then selects particular rows or pages. In response, the database locks the particular row, table or page, depending upon the database. The database client then inserts, updates or deletes the particular table entries as desired. The database client then performs a commit transaction operation, at which time the database will unlock the particular items which were locked. By providing the lock, the database prevents other users from accessing or overriding the particular rows, tables, and so on, which will be accessed by the first database client.

Similarly, file systems such as CIFS as provided by Microsoft will provide a read lock on a file server when an application on a client workstation reads the particular file. This can be done by as many clients as desired, but in some circumstances only the first client has the possibility of performing write operations. In other cases, CIFS will allow read locks to be broken to allow a particular party to write if desired. Further, CIFS is a stateful operation and if a particular workstation loses its connection to the server, the lock will be lost.

This losing of the connection brings up a second class of clients, those that are connected remotely, rather than over a local area network. WebDAV has attempted to address this problem by providing explicit locking mechanisms. A particular client requests a lock and receives it for a given duration. If the time passes, the lock is released if the client has not re-specified the lock. While this does provide advantages in a remote operation, it still has disadvantages in that all operations must be explicit from the client and are entirely time based.

It is desirable to have an improved file sharing mechanism with improved locking capability, particularly for use with remote clients, to better optimize a file locking operation.

SUMMARY OF THE INVENTION

File systems according to the present invention provide several different and improved capabilities. In the preferred embodiments, an application is present on a client workstation and the application communicates through a client driver to the server. The server then interfaces with a metadata database, which contains locking information about the desired files. Applications perform as normal, i.e., they open, read, write, close, as would otherwise normally occur. The client driver provides lock and unlock requests to the server when a write lock or a read with intent to write lock is required. If only a read lock is considered appropriate, the client driver does not provide a lock request to the server. The server, upon receiving a particular explicit lock request from the client driver, cooperates with the metadata database for the locking information. However, if only normal read operations are occurring without an intent to write, the server transparently performs read operations and read locking using the metadata database without specific requests from the client driver. This allows simple client operation and yet provides the security required in most circumstances.

In addition, when a lock is required, such as the read with intent to write or write locks, the lock ownership is placed in the metadata database with a given expiration time. However, unlike in WebDAV operations as described above, when the time expires the lock is not automatically released. The lock remains with the particular requesting client driver until another client driver requests it. In that manner, if no other client driver has requested a lock, the lock will remain with the originating client driver so that if it has been disconnected or off line for some period of time, such as a laptop going into hibernation or standby mode or a remote workstation which has lost connection, it will retain its lock and very conveniently understand that the file has been locked the entire time.

A BRIEF DESCRIPTION OF THE DRAWINGS

FIG. 6 is a flowchart of a read operation by the file handler according to the present invention.

FIG. 7 is a flowchart of a write operation by the file handler according to the present invention.

DETAILED DESCRIPTION OF THE PREFERRED EMBODIMENT

Figure 1:
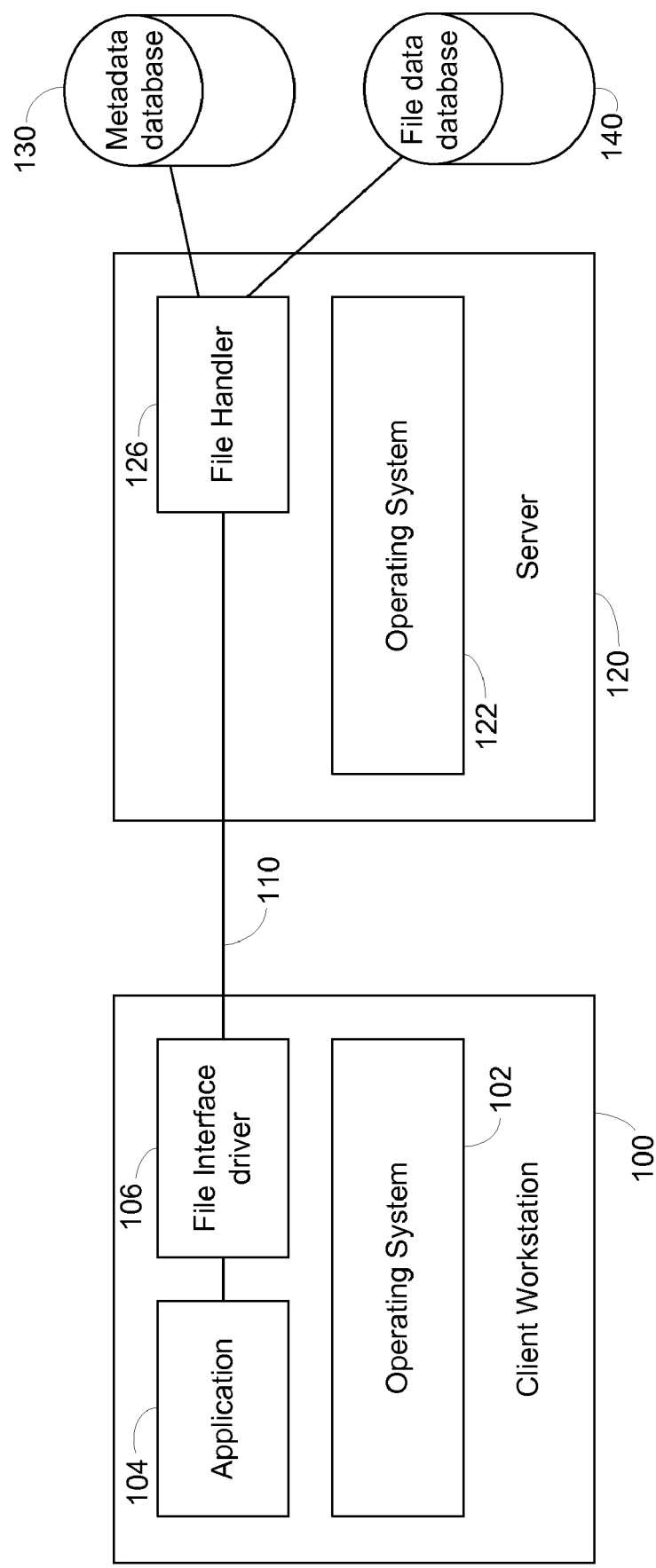
FIG. 1 is a block diagram of a system according to the present invention.

Referring to FIG. 1, a client workstation 100 is connected by a network 110, such as the Internet, to a server 120, which in turn is connected to a metadata database 130 and a file data database 140. The client workstation 100 includes an operating system 102, an application 104 and a file interface driver 106. As is well known, the operating system 102, application 104 and file interface driver 106 are stored on computer readable media. The server 120 includes an operating system 122 and a file handler 126. As is well known, the operating system 122 and file handler 126 are stored on computer readable media. The file interface driver 106 is in communication with the file handler 126 which is in communication with the metadata database 130 and the file data database 140. In operation, the application 104 operates through the file interface driver 106, which communicates with the file handler 126 which performs the necessary operations with the metadata database 130 and the file data database 140. This is a simplified illustration for descriptive purposes. It is understood that the client workstation 100, the server 120, metadata database 130 and the file data database 140 may be configured in many different arrangements and can be replicated as desired. In addition, it is understood that multiple client workstations 100 will be connected to a single server 120.

Figure 2:
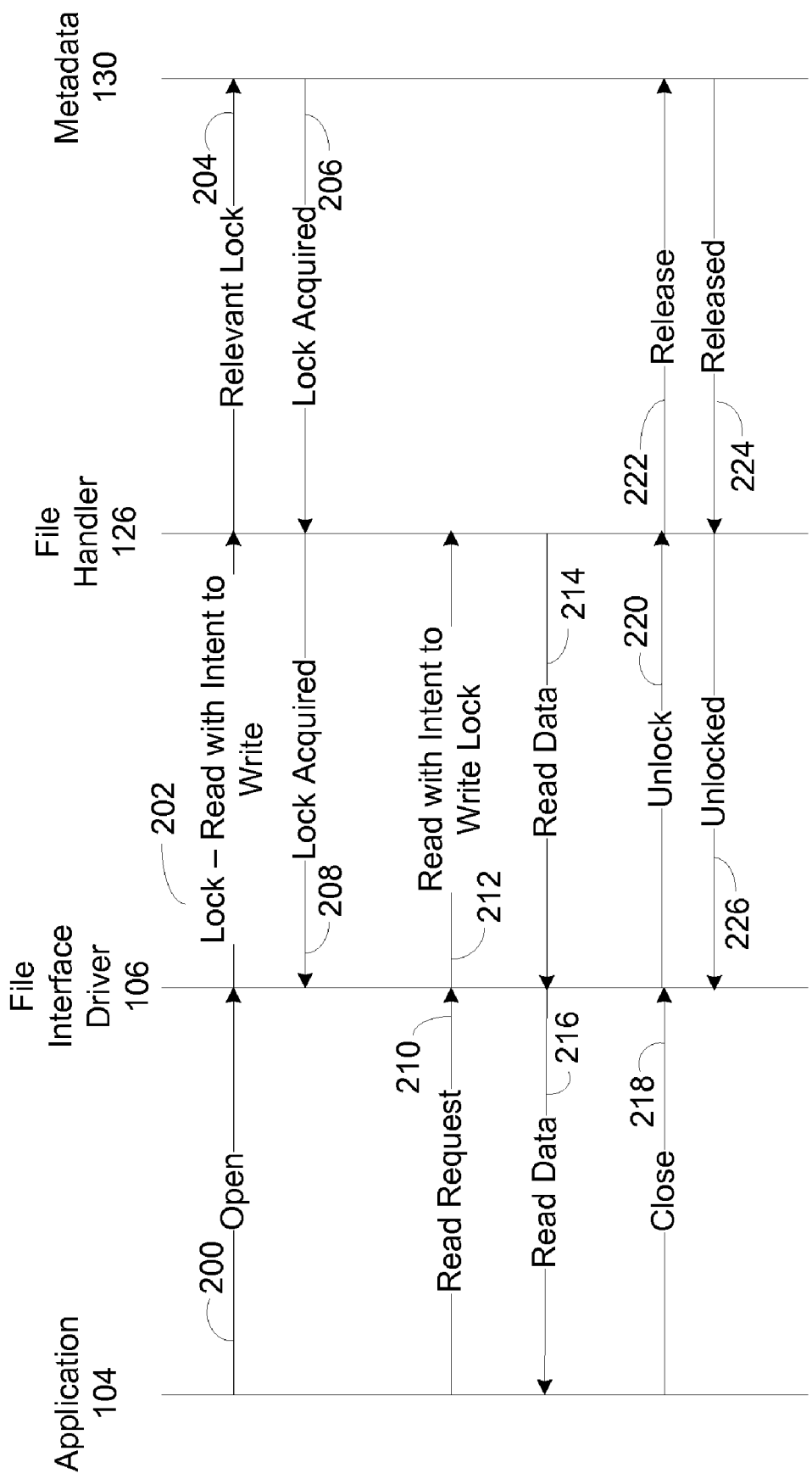
FIG. 2 is a ladder diagram of selected read operations according to the present invention.

Referring to FIG. 2, operations according to the preferred embodiment are shown in a ladder diagram. In the first operation 200, the application 104 provides an open request 200 to the file interface driver 106. Based on the particular open request 200, the file interface driver 106 provides a read with intent to write lock request 202 to the file handler 126. The file handler 126 then places a read with intent to write lock request in operation 204 into the metadata database 130. If the lock is acquired from the metadata database 130, described below in more detail, in operation 206, this is an indication that no other outstanding read with intent to write or write locks are present on the particular file. The lock is returned to the file handler 126 which in operation 208 returns it to the file interface driver 106. Sometime later, in operation 210, the application 104 provides a read request 210 to the file interface driver 106. The file interface driver 106 provides the read request to the file handler 126 in operation 212. In operation 214 the file handler 126 has obtained the data and returns the data to the file interface driver 106, which in operation 216 returns the data to the application 104. Sometime later in operation 218, the application 104 provides a close to the file interface driver 106, which then provides an unlock request 220 to the file handler 126. The file handler 126 then provides a release operation 222 to the metadata database 130, releasing the read with intent to write lock. If it is successfully released, in operation 224 the acknowledgement is provided to the file handler 126 which then provides an unlocked acknowledgement in operation 226 to the file interface driver 106.

Figure 3:
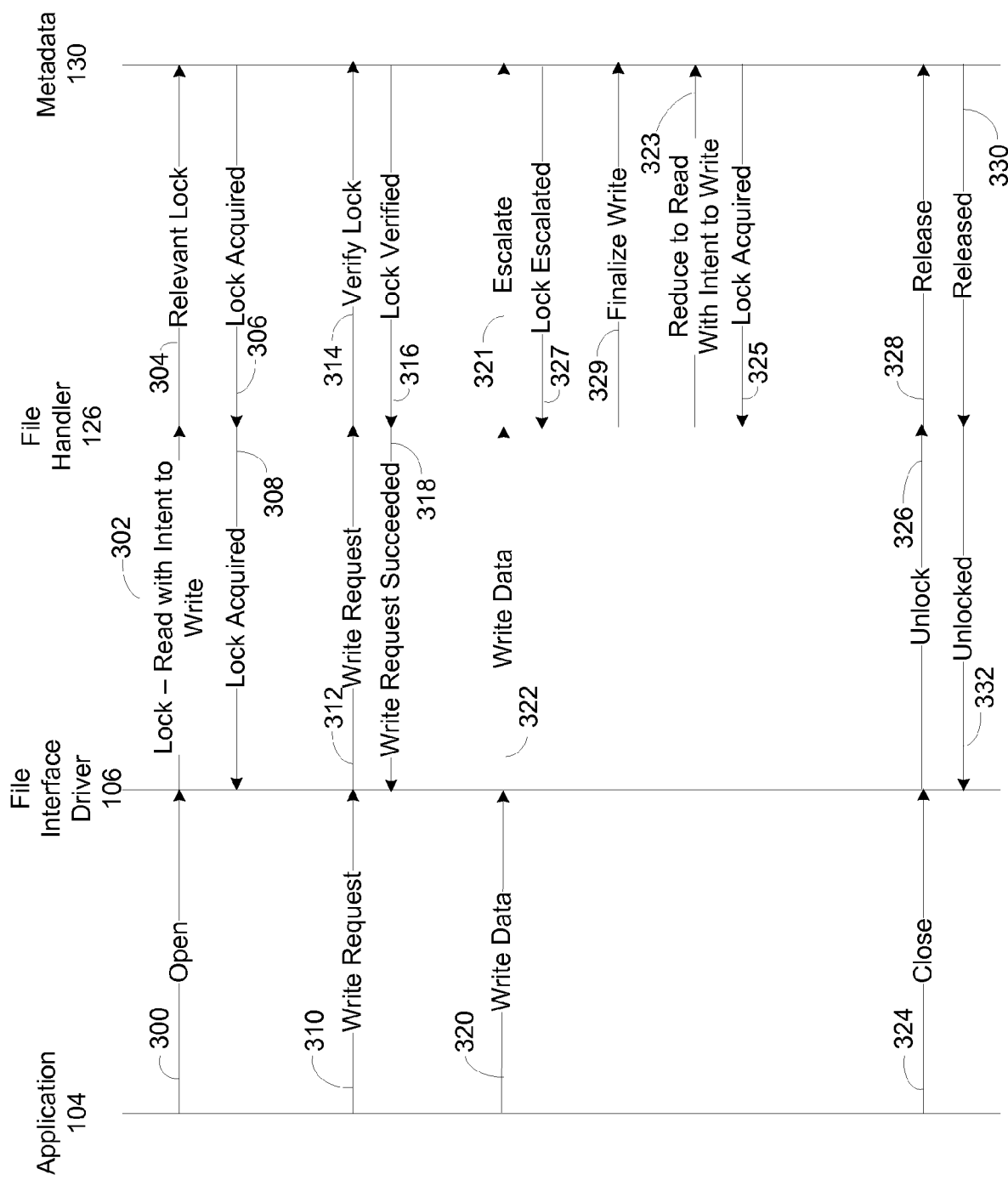
FIG. 3 is a ladder diagram of write operations according to the present invention.

FIG. 3 illustrates a write operation. The application 104 in operation 300 provides an open request to the file interface driver 106, indicating that write operations may occur. The file interface driver 106 provides a read with intent to write lock request in operation 302 to the file handler 126, which then provides a read with intent to write lock request in operation 304 to the metadata database 130. The metadata database evaluates and determines if a read with intent to write lock is available, i.e., there are no write lock or other read with intent to write locks. If the lock is available, then in operation 306 a lock acquired acknowledgement is provided to the file handler 126, which then forwards the lock acquired acknowledgment in operation 308 to the file interface driver 106. Sometime later the application 104 provides a write request 310 to the file interface driver 106. The write request is forwarded by the file interface driver 106 in operation 312. This causes the file handler 126 to verify the read with intent to write lock in operation 314. The lock is verified and indication is provided in operation 316. The success of the write request is provided in operation 318 to the file interface driver 106. The application 104 then in operation 320 provides the write data to the file interface driver 106 which forwards the write data in operation 322 to the file handler 126. In operation 321 the file handler 126 provides an escalate request to the metadata database 130. Escalate request is used here to ease understanding but it is understood that the phrase write request could be used as well. When the conditions are met as described below, the success of the lock escalation is provided in operation 327 to the file handler 126. The file handler 126 finalizes the write in operation 329 and the data is written to the file data database 140. After the write operation is completed the file handler 126 provides a request to reduce the lock to a read with intent to write in operation 323. The metadata base 130 signals acceptance in operation 325.

Sometime later the application 104 provides a close request in operation 324 to the file interface driver 106 which converts this to an unlock request operation 326 to the file handler 126 which converts this operation to a release request to the metadata database 130 in operation 328. The lock release is acknowledged in operation 330 to the file handler 126 and then the unlocked acknowledgement is provided from the file handler 126 to the file interface driver 106 in operation 332.

Figure 4:
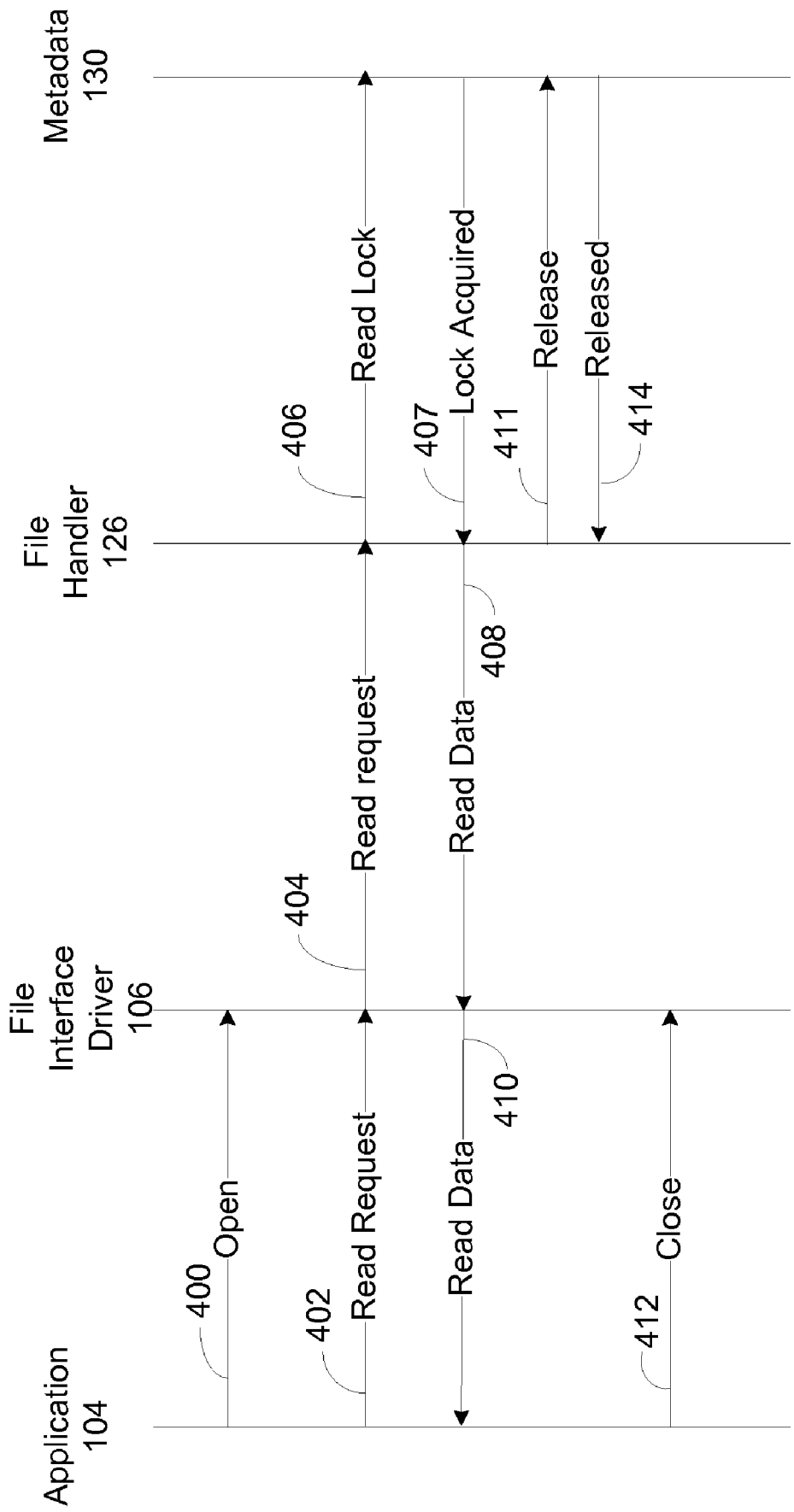
FIG. 4 is a ladder diagram of simple read operations according to the present invention.

FIG. 4 illustrates a simple read operation where the application does not indicate a write or a possible intent to write. The application provides a simple open request in operation 400 to the file interface driver 106. Because there is no read with intent to write or write indication, the file interface driver 106 simply accepts the open. Sometime later the application 104 provides a read request to the file interface driver 106 in operation 402. The file interface driver 106 provides the read request in operation 404 to the file handler 126. The file handler 126 provides a read lock request in operation 406 to the metadata database 130. If successful, a lock acquired response is provided in operation 407 to the file handler 126, which then obtains the read data in operation 408 and provides it to the file interface driver 106. The file interface driver 106 in operation 410 provides the data to the application 104. It is noted that after the read data has been obtained in operation 408, the file handler 126 provides a release request 411 to the metadata database 130 to release the lock. It is released in operation 414. It is noted that this locking has been totally transparent to the application 104. Sometime later the application 104 provides a close request in operation 412 to the file interface driver 106 and the file interface driver 106 simply closes the file request, no locks being in place because only the temporary or transparent read lock was obtained during the actual read operations.

Figure 5:
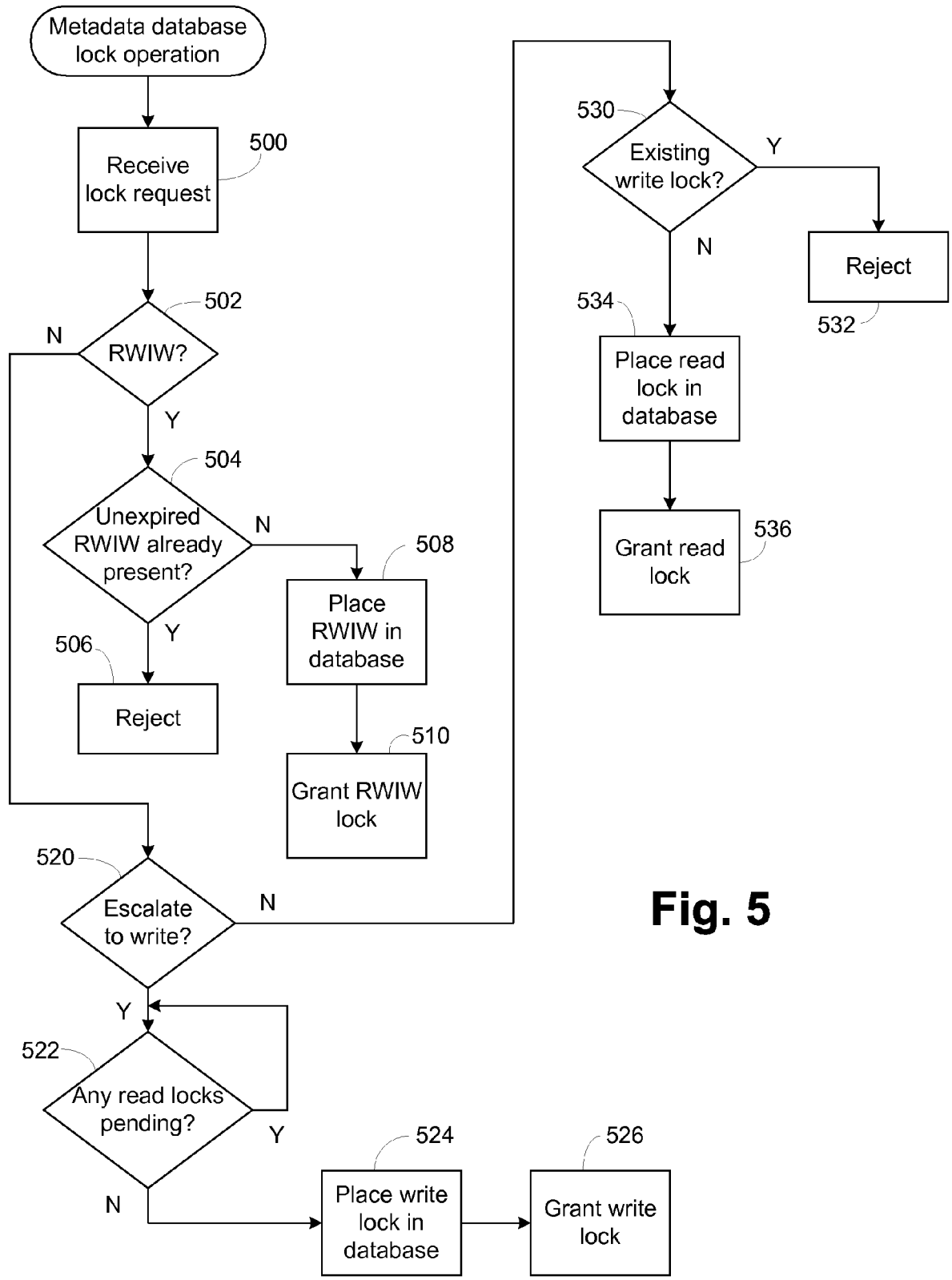
FIG. 5 is a flowchart of lock operations in the metadata database according to the present invention.

Referring now to FIG. 5, general operations of a metadata database lock operation is illustrated. In step 500 the metadata database 130 receives a lock request. In step 502 it determines if this is a read with intent to write request. If so, in step 504 it determines if there is an unexpired read with intent to write lock already present for the particular file by another client or user. If so, this is an indication that some other user has already requested this lock and therefore a rejection is returned in step 506. However, if it is the same user or client as would be in the case of a renewal or updating of a lock, or no current request or lock is pending, then in step 508 the read with intent to write lock is placed in the database with an indication of the particular user and file. In step 510 the actual read with intent to write lock, as illustrated in operation 206, is provided.

If it was not a read with intent to write lock in step 502, control proceeds to step 520 to determine if it was a request to escalate to write lock. If so, in step 522 a determination is made as to whether any read locks are pending for the particular file because a write operation is exclusive and existing read locks must be completed or removed prior to granting the write lock. As described in more detail below, read locks are relatively short-lived locks in the preferred embodiment so the operation remains in step 522 while the existing read locks are cleared. After all read locks have been cleared, in step 524 the write lock indication is placed in the database and in step 526 the granting of the write lock is indicated as in operation 316.

If it was not an escalate to write request, in step 520 control proceeds to step 530 to determine if there is a pending or present write lock. If so and because effectively this is a request to provide a read lock, then the write lock exclusivity causes a rejection to be provided in step 532. If there was no write lock present, control proceeds to step 534 where a read lock is placed in the database and then to step 536 where the granting of the read lock is performed as illustrated in operation 407.

FIG. 6 illustrates a read operation of the file handler 126 according to the preferred embodiment. In step 600 the file handler 126 obtains the metadata for the particular file from the metadata database 130. In step 602 the file handler 126 determines that the file requested is actually accessible in the file data database 140. If it is accessible, then in step 604 the read lock is placed in the metadata database 130. In step 606 an open file handle is provided to the file system of the file data database 140. With this open file handle placed in step 606, then in step 608 the read lock in the metadata database 130 can actually be released because in the preferred embodiment an actual data file is not deleted or removed from the file data database 140 until all open file handles have been closed. In step 610 a streaming read operation from the file data database 140 through the file handler 126 is initiated and ultimately when it is completed in step 612 the file handle is closed, thus completing the operation. As can be seen, the actual amount of time that a read lock is actually contained in the metadata database 130 is basically the amount of time needed to do an open file handle operation. As a result, read locks are extremely transitory and therefore the delay of an escalation to a write lock is also a relatively short-lived event.

FIG. 7 illustrates the write operations of the preferred embodiment of the file handler 126. In step 700 it is assumed that a read with intent to write lock is present for the file. Then in step 702 the file handler 126 receives the write request from the file interface driver 106. The file handler 126 then in step 704 uploads the data for the particular client so that all of the data is present on the server 120 prior to actually requesting the write lock. Then in step 706 the file handler 126 provides a write lock indication to the metadata database 130 to escalate from read with intent to write lock to write lock. After the write lock is in place, in step 708 the catalog information for the file is written to the metadata database in normal fashion. In step 710 the data which has been uploaded is written to the file data database 140. After the write completed, in step 712 the lock level present in the metadata database 130 is reduced to a read with intent to write lock from a write lock.

One characteristic of any lock placed in the metadata database 130 is that it includes an expiration time. Unlike prior art operations, when the expiration time has passed, the lock is not released but stays in place. If a particular originally requesting client renews a lock, as must be done periodically to maintain the lock in any circumstance and is done after the client reconnects or awakens from standby or hibernation, then the expiration time is extended, assuming it has not lapsed. If, however, the time has lapsed, such as when the client has gone offline, for example due to connection failures or a suspension or hibernation operation, any renewal request is honored and an acknowledgment is provided if the file has been locked to that particular client the entire time, even though the expiration time had passed, and the client need not worry about the coherence. However, because the expiration time has passed, should a different client request a lock on the file, then that client will be able to acquire the lock. Then if the original requesting client at a later time attempts to renew the lock after having come out of hibernation, for example, the renewal will be denied and no lock ID will be provided as done in the normal case, thus indicating that the file has become unlocked and may not be coherent.

Figure 8:
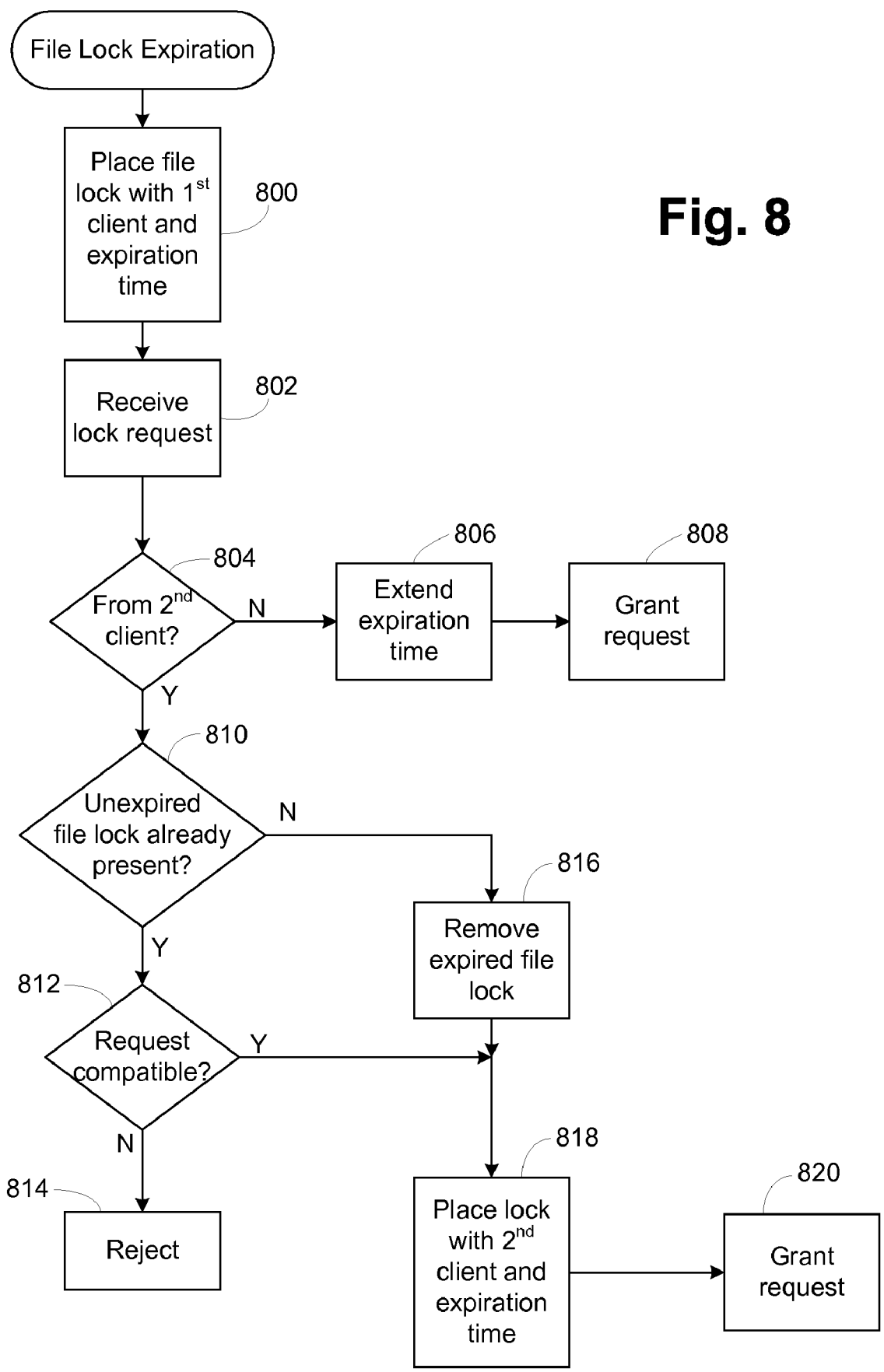
FIG. 8 is a flow chart of lock expiration according to the present invention.

FIG. 8 illustrates this operation. In step 800 a file lock is set indicating a first client and the expiration time of the lock. In step 802 a file lock request is received. In step 804 it is determined if the lock is from a second client, a client other than the first client. If not, the request is effectively a refresh lock request, either explicitly or implicitly. In step 806 the expiration time is extended or reset and step 808 provides the acknowledgment.

If the request is from a second client in step 804, in step 810 a check is made to determine if an unexpired file lock to a first client is in place. If so, the request may be compatible, such as a read lock request with an existing read with intent to write lock, and this is determined in step 812. If not compatible, in step 814 a rejection is returned. If it is compatible, in step 818 the file lock is placed indicating the second client and an expiration time and in step 820 an acknowledgment is retained.

If an unexpired file lock was not in place in step 810, in step 816 any expired lock is removed and operation continues at step 818.

Operation of the read with intent to write lock is also different from the prior art. In various prior art embodiments, such as CIFS, many different clients can request a read with intent to lock. CIFS then escalates and breaks the other locks when one particular client chooses to write. In the preferred embodiment only a single client can obtain a read with intent to write lock. When that client chooses to escalate from a read with intent to a write lock as described above, the acknowledgement need only be delayed while the server manages all the other read locks which are present. Because the read locks are transparent, i.e., that as they are only controlled at the server level and are developed only during the actual read operation itself as described above, the read with intent to write will quickly be escalated to a write state without the need to break other locks and in a timely manner.

In this description a metadata database has been described as containing and managing the lock status of the files. It is understood that this is one embodiment and other embodiments of locking mechanisms could be utilized, such as a central lock manager or centrol lock storage with a series of distributed locking modules.

The above embodiments improve operation with remote clients and allow stateless operation of the multi-user environment without the burdensome or problem-ridden prior art locking mechanisms.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of for file locking multi-user accessible files contained on a server, the server receiving write lock requests and read with intent to write lock requests but not read lock requests and read and write operations from a client and cooperating with a locking mechanism which sets and contains file lock status, the lock status including read, write and read with intent to write, the method comprising:

receiving write lock requests and read with intent to write lock requests and read and write file operations from the client, where write lock requests precede write operations;

providing read with intent to write lock requests to the locking mechanism if a read with intent to write request is received;

providing a read with intent to write lock request to the locking mechanism on initial receipt of a write lock request, escalating the lock state to a write lock using an escalate lock request to the locking mechanism when a write operation is received, and reducing to a read with intent to write lock using a request to the locking mechanism when the write operation is completed; and providing a read lock request to the locking mechanism if a read operation is received without a prior read with intent to write lock request and providing a read lock release request to the locking mechanism at a time where the read operation is committed.

2. The method of claim 1, wherein said escalation lock request is provided only after the write data for the write operation is received from the client.

3. A computer readable medium or media having computer executable instructions for performing a method for file locking multi-user accessible files contained on a server, the server receiving write lock requests and read with intent to write lock requests but not read lock requests and read and write operations from a client and cooperating with a locking mechanism which sets and contains file lock status, the lock status including read, write and read with intent to write, the method comprising:

receiving write lock requests and read with intent to write lock requests and read and write file operations from the client, where write lock requests precede write operations;

providing read with intent to write lock requests to the locking mechanism if a read with intent to write request is received;

providing a read with intent to write lock request to the locking mechanism on initial receipt of a write lock request, escalating the lock state to a write lock using an escalate lock request to the locking mechanism when a write operation is received, and reducing to a read with intent to write lock with a request to the locking mechanism when the write operation is completed; and providing a read lock request to the locking mechanism if a read operation is received without a prior read with intent to write lock request and providing a read lock release request to the locking mechanism at a time where the read operation is committed.

4. The medium or media of claim 3, wherein said escalation lock request is provided only after the write data for the write operation is received from the client.

* * * * *